(12) United States Patent
Hartney et al.

(10) Patent No.: US 7,329,076 B2
(45) Date of Patent: Feb. 12, 2008

(54) HOLE LOCATION GAUGES AND METHODS

(75) Inventors: Nicholas A. Hartney, St. Petersburg, FL (US); Kim R. Heinicka, Seminole, FL (US); Winston S. Webb, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 11/001,801

(22) Filed: Dec. 1, 2004

(65) Prior Publication Data

US 2006/0115343 A1 Jun. 1, 2006

(51) Int. Cl.
*F16B 13/06* (2006.01)
*G01D 21/00* (2006.01)
*G01B 5/00* (2006.01)

(52) U.S. Cl. .............. 411/60.1; 411/60.2; 411/954; 411/271; 411/325; 33/520; 33/613; 33/644; 33/542

(58) Field of Classification Search .............. 411/60.1, 411/60.2, 271, 325, 954; 33/520, 613, 694, 33/1 CC, 645, 542
See application file for complete search history.

(56) References Cited

U.S. PATENT DOCUMENTS

| 990,065 | A | * | 4/1911 | Sargeant | 411/271 |
|---|---|---|---|---|---|
| 1,166,049 | A | * | 12/1915 | Hyde | 411/201 |
| 1,607,862 | A | * | 11/1926 | Bath | 33/544.5 |
| 2,686,371 | A | * | 8/1954 | Flis | 33/520 |
| 2,700,224 | A | * | 1/1955 | Johnson | 33/199 R |
| 3,026,621 | A | * | 3/1962 | Papps et al. | 33/520 |
| 3,336,677 | A | * | 8/1967 | Newton | 33/638 |
| 3,352,343 | A | * | 11/1967 | Stitt | 411/271 |
| 3,534,480 | A | * | 10/1970 | Whisenant et al. | 33/543 |
| 4,073,212 | A | * | 2/1978 | Lerich | 411/54 |
| 4,222,173 | A | * | 9/1980 | Hall | 33/533 |
| 4,252,167 | A | * | 2/1981 | Dessouroux | 411/263 |
| 4,383,368 | A | * | 5/1983 | Morawski et al. | 33/529 |
| 4,571,838 | A | * | 2/1986 | Stout, III | 33/701 |
| 4,754,551 | A | * | 7/1988 | Scott | 33/543 |
| 5,179,788 | A | * | 1/1993 | Jadach | 33/644 |
| 5,219,254 | A | * | 6/1993 | Ball et al. | 411/271 |
| 5,377,417 | A | * | 1/1995 | Sentman | 33/199 R |

(Continued)

OTHER PUBLICATIONS

Brochure, "Fast, Accurate, Consistent Inspection Results, TRU-POS™ LOCATORS, As Fundamental As the Probe Itself", LaVezzi Precision, Inc., Glendale Heights, Illinois, (1999).

*Primary Examiner*—Katherine Mitchell
(74) *Attorney, Agent, or Firm*—Fogg & Powers LLC

(57) ABSTRACT

The present invention provides devices and methods for indicating or gauging the position of one or more holes in a workpiece. In one aspect of the present invention reusable devices that can be removably engaged with a bore or tapped hole in a workpiece for accurately indicating the center axis of the bore or tapped hole are provided. An exemplary device in accordance with the present invention includes an expandable shank, indicating surface, and driving head. The driving head can be used to install the device into a hole in a workpiece. The expandable shank can be expanded to positively engage the device with the hole in the workpiece and the indicating surface can be referenced, with a probe, to determine the center axis of the hole in the workpiece.

8 Claims, 6 Drawing Sheets

U.S. PATENT DOCUMENTS

| | | | |
|---|---|---|---|
| 6,427,356 B1* | 8/2002 | Schamal | 33/613 |
| 6,519,865 B1* | 2/2003 | Yelverton | 33/645 |
| 2002/0054805 A1* | 5/2002 | Kaibach et al. | 411/60.1 |
| 2003/0121167 A1* | 7/2003 | Yelverton | 33/645 |
| 2006/0002782 A1* | 1/2006 | Elwell | 411/57.1 |

* cited by examiner

HOLE LOCATION GAUGES AND METHODS

TECHNICAL FIELD

The present invention relates to devices and methods for indicating or gauging the position of one or more holes in a workpiece. More particularly, the present invention relates to reusable devices that can removably engage with a bore or tapped hole in a workpiece for accurately indicating the central axis of the bore or tapped hole.

BACKGROUND

In many technical applications components are assembled with threaded fasteners. For example, where it is desired to assemble a first component to a second component, tapped holes are formed in one component while corresponding clearance holes are formed in the second component. The two components are positioned with respect to each other so that the clearance holes are aligned with the tapped holes. Threaded fasteners, such as screws or bolts or the like, are then used to secure the components together.

Usually, the machine tools that are used to form such tapped and clearance holes can easily provide the required accuracy in the positioning of such holes for proper alignment and fit of the components to be assembled without the use of additional gauging and measuring equipment. This is especially true where high precision alignment between the components is not required. However, where high precision alignment of components is required, gauging devices may be needed to facilitate and increase the accuracy of measuring the locations of hole positions (center axes, for example) with respect to each other and/or with respect to other reference points. Often, such high precision is required for alignment of optical systems such as guidance and navigation systems.

One technique that can be used to indicate the centerline of a hole includes the use of a gauging device. One such gauging device for indicating the centerline of a tapped hole (or a bored hole) is shown in U.S. Pat. No. 3,026,621 to Papps et al. The hole position gauging device of Papps et al. has a threaded section adapted to screw into the hole to be indicated and a concentric cylindrical stem that extends above the hole. The tolerances for the concentricity of the stem relative to the threaded section and the diameter of the stem are known so that the stem can indicate, within a known tolerance, the centerline of the hole in which the gauging device is installed. For example, the stem can be contacted with a caliper or other position indicator in order to determine the position of the centerline of the tapped hole relative to another tapped hole, a machine tool, reference structure, or in a predetermined frame of reference.

Another device for locating the centerline of a tapped hole is shown in U.S. Pat. No. 5,179,788 to Jadach. The gauging device of Jadach is similar to the gauging device of Papps et al. except that the Jadach device uses a counterbore instead of a stem as an indicating feature. The counterbore allows for faster and easier measurement with programmable touch probe coordinate measuring machines in that fewer moves by the probe are needed to contact plural points on the inside surface of the counterbore as compared to using a stem. This is because plural points of the counterbore surface can be contacted by moving the probe along a linear path within the counterbore and the probe does not need to be moved over or around the stem.

One problem with the gauging devices of Papps et al. and Jadach is that a typical threaded fastener and the tapped hole into which it fits are intentionally designed to have some clearance or play between them in order to allow them to be separable. That is, they are not a perfect fit with each other in order to avoid interference that could cause them to become permanently locked together. Because of this, the threaded section of the devices of Papps and Jadach inherently has some play when installed in a threaded hole as the devices are designed to be reusable. This play can introduce measurement errors because the gauge is not locked in place with respect to the tapped hole and reduces the overall precision of the gauging device.

Another problem with the gauging devices of Papps et al. and Jadach is that they are designed to seat on a flat surface. As such, these devices are generally unsuitable for use with uneven or irregular surfaces. This is because any deviation in the perpendicularity of the centerline of the tapped hole with respect to the surface can introduce measurement errors. Conventional hole gauges, similar to the gauges of Papps et al. and Jadach, are available for use with uneven or irregular surfaces. These hole gauges have a threaded portion that is tapered. When such a tapered threaded portion is threaded into a tapped hole in a workpiece, the taper causes the threads of the threaded portion to interfere with the threads of the tapped hole thereby locking the gauge in the threaded hole. However, because the interference occurs near the surface of the workpiece and at the top of the tapped hole as a result of the tapered structure, these gauges are susceptible to being canted after being installed especially if the gauge is unintentionally bumped or jarred.

SUMMARY

The present invention thus provides hole position gauges that can be used to accurately and repeatably indicate a center axis of a tapped hole. Such gauges can also be used to indicate a center axis of a bored hole, such as a hole that is not tapped. An exemplary hole position gauge in accordance with the present invention includes a threaded portion that is at least partially expandable when positioned in such a hole and a reference or indicating surface in a known positional relationship with the threaded portion. As such, hole position gauges of the present invention overcome the shortcomings of the prior art by expanding the threaded portion of the gauge to remove any clearance that might exist between the threaded portion of the gauge and the tapped hole in which it is used. This functions to improve the accuracy and repeatability of hole position gauges of the present invention because the thread pitch diameter of the tapped hole can be positively referenced by the gauge.

In one aspect of the present invention, a method for indicating the center axis of a hole formed in a workpiece is provided. In this method, a hole position gauge having an expandable shank and an indicating surface is provided. The indicating surface has a predetermined geometric alignment with the expandable shank. The expandable shank is positioned in a hole in a workpiece. The expandable shank is expanded, at least partially, to positively engage an outside surface portion of the expandable shank with an inside surface portion of the hole in the workpiece. The indicating surface is referenced to determine the center axis of the hole in the workpiece. Also, the expandable shank is contracted to disengage the expandable shank from the hole in the workpiece and the expandable shank is removed from the hole in the workpiece.

In another aspect of the present invention, a method for indicating the center axis of a threaded hole formed in a workpiece is provided. In this method, a hole position gauge having an expandable threaded shank and an indicating surface is provided. The expandable threaded shank has a pitch diameter and the indicating surface has a predetermined geometric alignment with the pitch diameter of the expandable threaded shank. The expandable threaded shank of the hole position gauge is positioned in a threaded hole in a workpiece, wherein the threaded hole in the workpiece has a pitch diameter. The expandable threaded shank is expanded, at least partially, to geometrically align the pitch diameter of the expandable threaded shank with respect to the pitch diameter of the threaded hole in the workpiece. Additionally, the indicating surface of the hole position gauge is referenced to determine the center axis of the hole in the workpiece.

In another aspect of the present invention, a method for indicating the center axis of a hole formed in a workpiece is provided. In this method, a hole position gauge having a threaded shank and an indicating surface is provided. The threaded shank has an expandable portion having a pitch diameter and the indicating surface has a predetermined geometric alignment with the pitch diameter of the expandable portion of the threaded shank. The expandable portion of the threaded shank is positioned in a threaded hole in a workpiece. The expandable portion of the threaded shank is expanded, at least partially, so that at least a portion of at least one thread of the expandable portion of the threaded shank is moved to more physically contact at least a portion of at least one thread of the threaded hole to positively engage the threaded shank with the hole in the workpiece. The indicating surface of the hole position gauge is referenced to determine the central axis of the hole in the workpiece.

In yet another aspect of the present invention, a hole position gauge for indicating the center axis of a tapped hole formed in a workpiece is provided. The hole position gauge comprises a threaded shank having an expandable portion, a driving head, an indicating surface, and means for expanding the expandable portion of the threaded shank. The threaded shank is designed so that the threaded shank can be positioned in a tapped hole in a workpiece. The threaded shank comprises an expandable portion that is expandable to positively engage with at least a portion of the tapped hole in the workpiece and contractable to disengage the expandable portion from the tapped hole in the workpiece. The driving head can be used for installing the threaded shank into the tapped hole in the workpiece and for removing the threaded shank from the tapped hole in the workpiece. The indicating surface is distinct from the driving head and has a predetermined geometric alignment with the threaded shank so that the indicating surface can be referenced to indicate the center axis of the tapped hole in the workpiece.

In another aspect of the present invention, a hole position gauge for indicating the center axis of a tapped hole formed in a workpiece is provided. The hole position gauge comprises a driving head, a shank, a shaft, and a driving device. The driving head can be used for installing the hole position gauge into the tapped hole in the workpiece and for removing the hole position gauge from the tapped hole in the workpiece. The shank comprises an indicating surface, distinct from the driving head and having a predetermined geometric alignment with the center axis of the shank and an expandable sleeve having a predetermined geometric alignment with the center axis of the shank. The expandable sleeve has an inside cavity that includes a tapered portion. The shaft is slidingly positioned within the inside cavity of the sleeve and comprises a tapered portion mateable with the tapered portion of the inside cavity of the sleeve. The driving device is designed so that the driving device can translate the shaft with respect to the sleeve to drive the tapered portion of the shaft to engage with the tapered portion of the inside cavity of the expandable sleeve for expanding the expandable sleeve.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
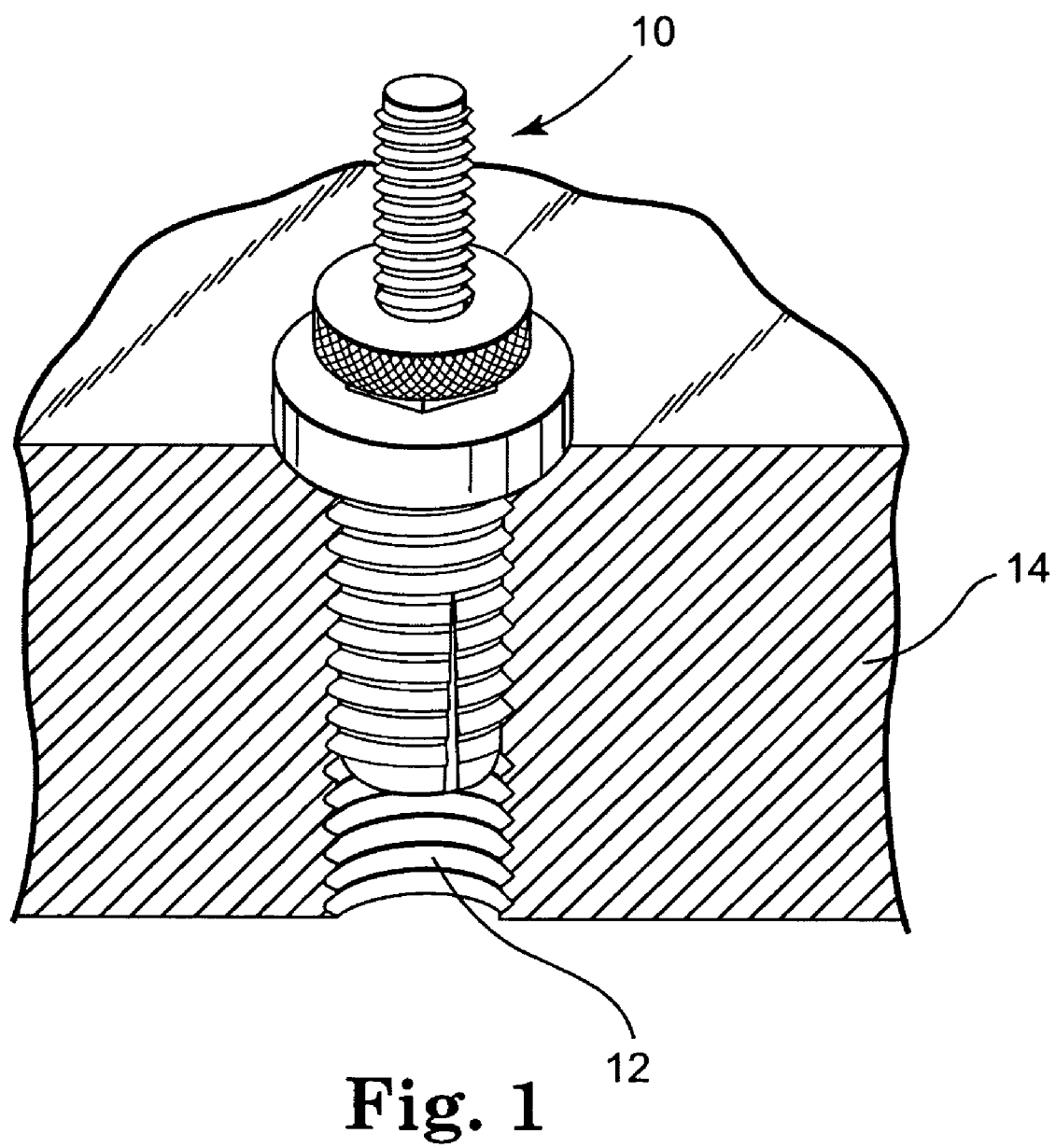
FIG. 1 is a perspective view partially in cross-section, of an exemplary hole position gauge shown positioned in a tapped hole in a workpiece in accordance with the present invention.
Figure 2:
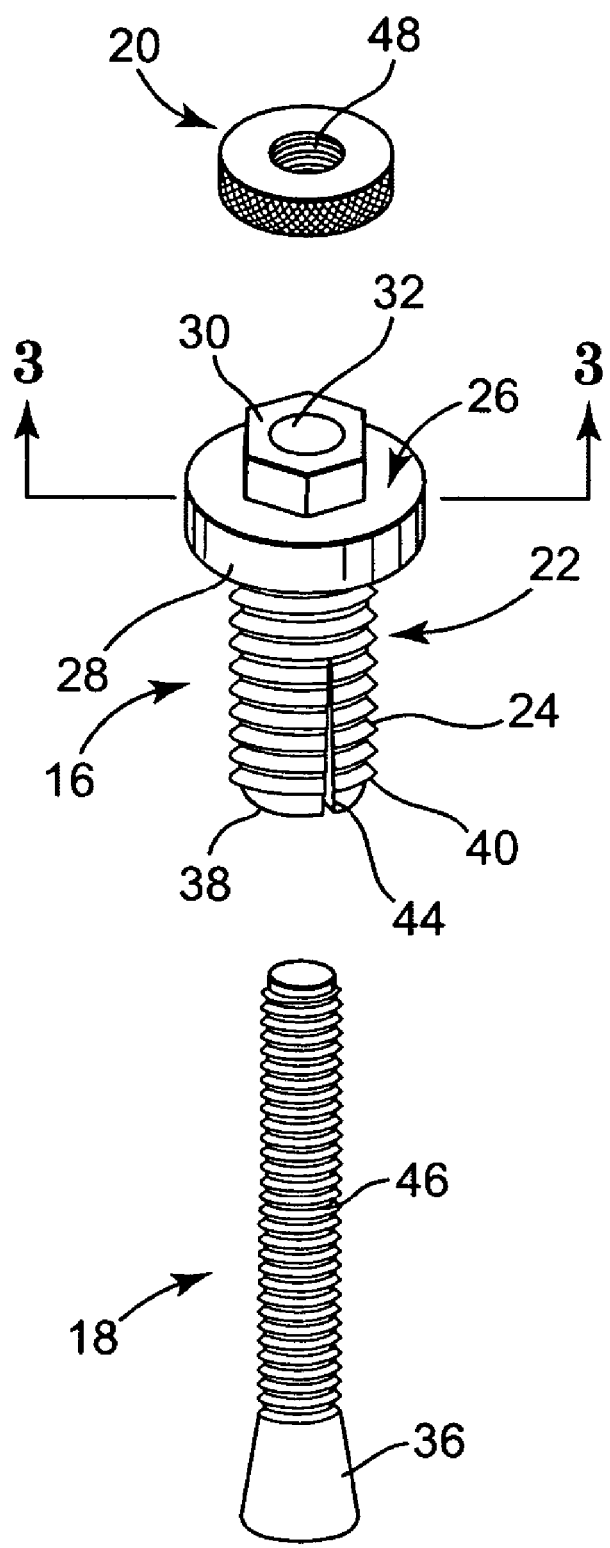
FIG. 2 is an exploded view of the hole position gauge shown in FIG. 1, showing a body having an expandable threaded shank, indicating surface, and driving head, and an expander having a threaded shaft and a tapered portion, and a driving device for driving the expander to expand the expandable threaded shank in accordance with the present invention.

Referring to FIGS. 1 and 2, one exemplary embodiment of a hole position gauge 10 in accordance with the present invention is illustrated. In FIG. 1, the hole position gauge 10 is shown positioned in a tapped hole 12 of a workpiece 14. In FIG. 2, an exploded view of the hole position gauge 10 is shown. As will be described in detail below, the hole position gauge 10 can be used to indicate the center axis of the tapped hole 12. The center axis of the tapped hole 12 can be referenced within a known coordinate system, for inspection or verification of the position of the tapped hole 12. Moreover, the center axis of the tapped hole 12, as indicated by the hole position gauge 10, can be used as a reference for forming one or more additional features of the workpiece 14 in a predetermined positional relationship relative to each other. Such workpiece features may include tapped or bored holes, workpiece edges or surfaces, or any other feature desired to be positioned relative to another feature of the workpiece 14 in a controlled positional relationship. Also, while the exemplary hole position gauge 10 is shown and described herein with respect to indicating the center axis of a tapped hole, indicating devices and methods of the present invention are equally applicable for use with features that are not tapped, such as bores, slots, or other such openings that may be formed in a workpiece.

Generally, the exemplary hole position gauge 10 includes a body 16, an expander 18, and a driver 20. Referring to FIG. 2 and the cross-sectional view of the body 16 of FIG. 3, the body 16, as shown, includes a shank 22 having an expandable portion 24, indicating feature 26 having indicating surface 28, and head 30. As illustrated, the shank 22 of the body 16 is threaded to match the tapped hole 12 so that the shank 22 can be threaded into and engaged with the tapped hole 12. Preferably, the shank 22 is designed to have a predetermined fit, such as a clearance fit rather than an interference fit, with the tapped hole 12. Such fits are defined by conventional reference standards for mechanical components such as those related to tolerances for fasteners as provided by the International Organization for Standardization (ISO), for example.

Figure 3:
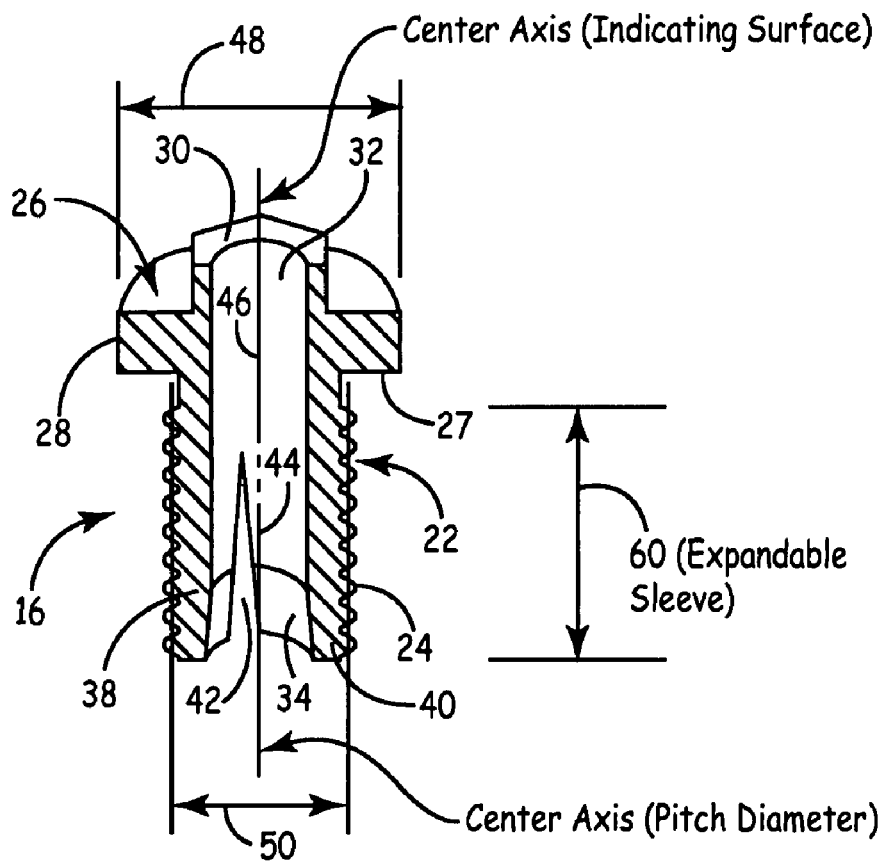
FIG. 3 is a cross-sectional view of the body of the hole position gauge shown in FIG. 2, showing a bore that can receive the shaft of the expander and having a tapered portion that can mate with the tapered portion of the expander for expanding the expandable portion of the threaded shank.

The hole position gauge 10 can be used as an indicator device to indicate or provide information related the position of a feature in accordance with the present invention. By indicating a feature with the hole position gauge 10, information related to the position of the feature in a coordinate system or relative to a known position can be provided. The shank 22 can be designed to mate with any desired feature to be indicated by the hole position gauge 10. For example, the shank 22 does not need to be threaded and may have a diameter to fit within a bore or other feature to be indicated. Moreover, the shank 22 does not need to be generally cylindrical, as illustrated in the Figures, and may have any shape that corresponds with a feature of a workpiece to be indicated. Features such as slots that have parallel or non-parallel sides, grooves, channels, keyways, as well any other openings or features formed in a workpiece that can receive a gauge or indicating device portion may be gauged in accordance with the present invention. Accordingly, the shank 22 is preferably designed to fit within such a feature so that the shank 22 is positionable in a predetermined geometric relationship with respect to the feature as described below (for example, as an expandable sleeve 60 as shown in FIG. 3).

The body 16 also includes a bore 32 that includes a tapered portion 34 that cooperatively functions with a tapered portion 36 of the expander 18 to expand the expandable portion 24 of the shank 22 when driven by the driver 20. The expandable portion 24 of the shank 22, as illustrated, is preferably divided into first and second portions, 38 and 40, such as by slits 42 and 44. The bore 32 is preferably designed so that there is a sliding fit between the bore 32 and a threaded shaft 46 of the expander 18. However, the bore 32 may be threaded to engage with the threads of the threaded shaft 46 to provide a driving fit between the bore 32 and the threaded shaft 46. Also, the tapered portion 36 of the expander 18 is preferably sized and designed so that it can engage with the tapered portion 34 of the bore 32 of the shank 22. The driving device 20, as illustrated, includes a threaded opening 48 that can be threaded onto the threaded shaft 46 of the expander 18 to drive the tapered portion 36 of the expander 18 into engagement with the tapered portion 34 of the bore 32 of the shank 22. As the tapered portion 36 of the expander 18 is driven into engagement with the tapered portion 34 of the bore 32 of the shank 22, the first and second portions, 38 and 40, of the expandable portion 24 of the shank 22 are driven apart from each other thereby causing the expandable portion 24 of the shank 22 to more positively engage with the tapped hole 12 as described in more detail below with respect to FIGS. 5 and 6.

The indicating feature 26 is preferably designed so that the indicating surface 28 has a precisely known geometric positional relationship with respect to the shank 22 and so that the indicating surface 28 can indicate the center axis of the tapped hole 12 when the hole position gauge 10 is positioned in the tapped hole 10. Preferably, the indicating surface 28 is designed to have a known geometric positional relationship with the pitch diameter (defined below) of the screw thread of the shank 22, which pitch diameter can be precisely related to the center of the body 16. Moreover, where the body 16 is accurately positioned to the bore 12 in accordance with the present invention, the central axis of the bore 12 is precisely indicated as well. In particular, where the indicating surface 28 is the outside surface of a cylinder, as illustrated, the indicating surface 28 is preferably concentric with the pitch diameter of the shank 22 within known tolerances (as shown in FIG. 3 at reference numeral 48).

Figure 4:
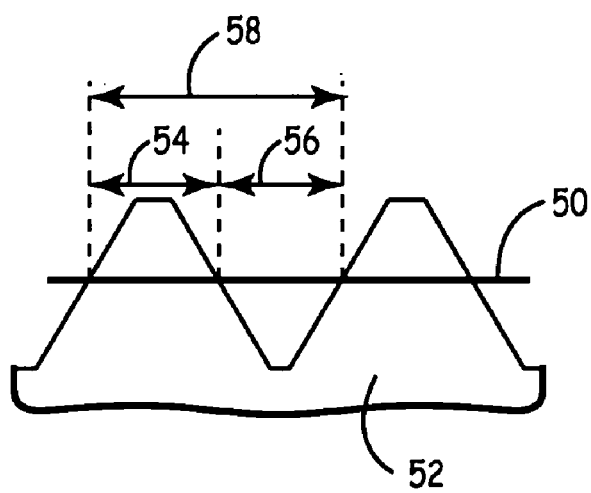
FIG. 4 is a schematic illustration of an exemplary screw thread showing in particular the pitch diameter of the screw thread of the expandable threaded shank of FIG. 3.

Generally, the pitch diameter of a screw thread is defined as the diameter of an imaginary cylinder having a surface that passes through the threads of the screw thread at a location where the width of the threads and the width of the spaces between threads cut by the surface of the cylinder are equal. Referring to FIG. 4, reference numeral 50 identifies a line that indicates the pitch diameter of a screw thread 52 of the shank 22. At the pitch diameter 50, the width of a thread (indicated by reference numeral 54) is equal to the width of the space between threads (indicated by reference numeral 56). The sum of the width 54 and the width 56 is equal to the pitch 58 of the screw thread 52, as indicated. In one respect, the pitch diameter of a screw thread is used to provide different fit classes for threaded fasteners. For example, for general use, the fit between a tapped hole and a threaded fastener does not need to be controlled within narrow tolerances. As such, the tolerances on the pitch diameters of the screw thread of the hole and the screw thread of the fastener for general use fasteners are typically broad. For high precision applications, however, narrow tolerances on the fit are required, and increased control of the pitch diameter tolerances is required. In any case, the significance of the pitch diameter is that the center axis of a threaded fastener or tapped hole is preferably defined as the center axis of the pitch diameter cylinder. Thus, for high precision applications, referencing the pitch diameter, rather than a major or minor diameter of a screw thread, in positioning tapped holes leads to increased precision and accuracy.

Regarding the hole position gauge 10, by referencing the pitch diameter 50 of the screw thread 52 of the shank 22 rather than some other geometric feature of the shank 22, such as the major or minor thread diameter of the shank 22, greater precision in determining the center axis of the body 16 and thus the tapped hole 12 can be achieved. One reason for such increased precision is that the expandable portion 24 of the shank 22 can be expanded to remove clearance or space between the threads of the hole 12 and the threads of the shank 22 by more positively engaging the threads of the shank 22 with the threads of the tapped hole 12. As such, the pitch diameter of the shank 22 will preferably be concentric (or for some screw threads may overlap) with the pitch diameter of the tapped hole 12 when the hole position gauge 10 is positioned in the tapped hole 12. Therefore, because the indicating surface 28 of the indicating feature 26 is defined and created by its reference to the pitch diameter of the shank 22, which is preferably positioned concentric with the pitch diameter of the tapped hole 12, the center axis of the tapped hole 12 can be precisely determined by determining the center axis of the shank 22.

Figure 5:
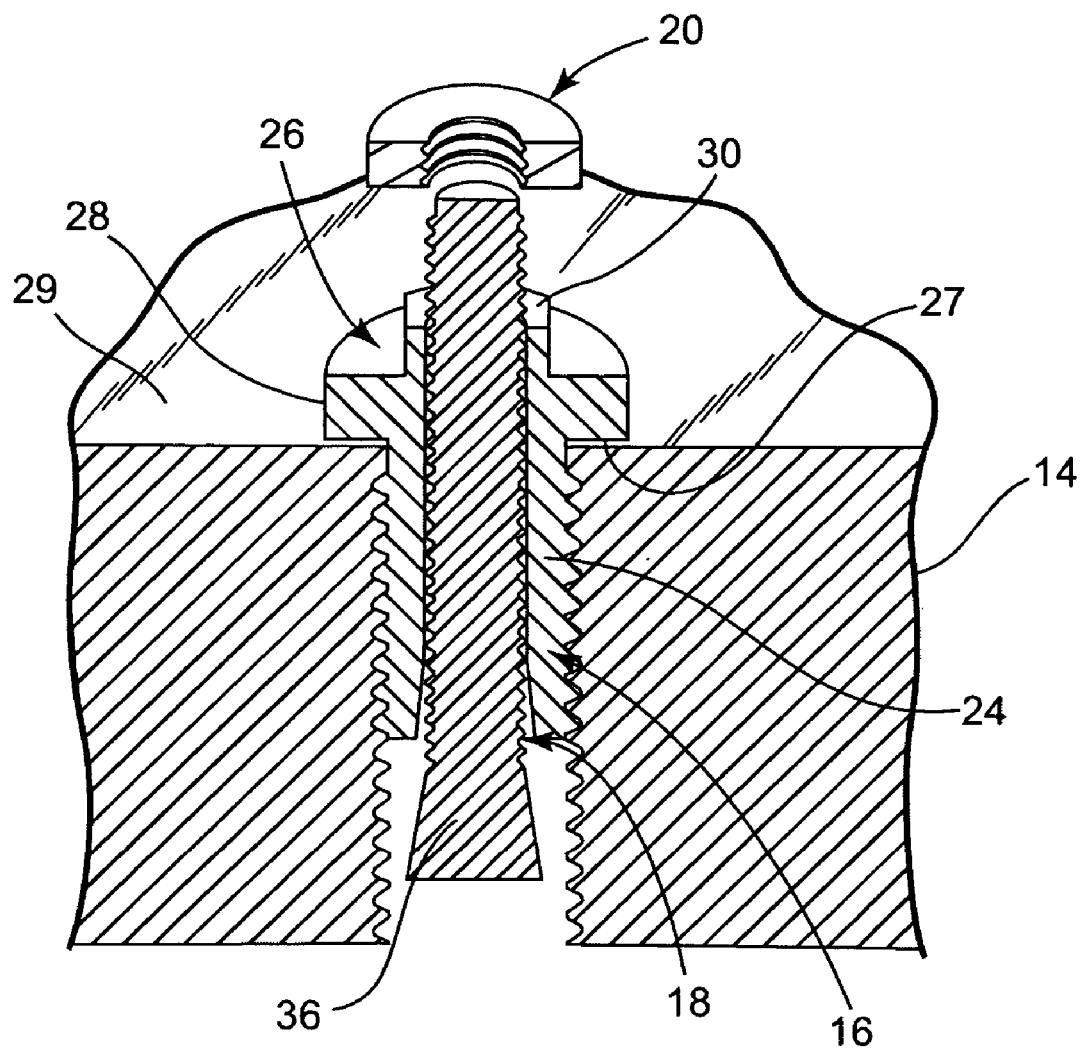
FIG. 5 is a perspective view, in cross-section, of the hole position gauge of FIGS. 1 and 2 showing the tapered portion of the expander in a contracted position.
Figure 6:
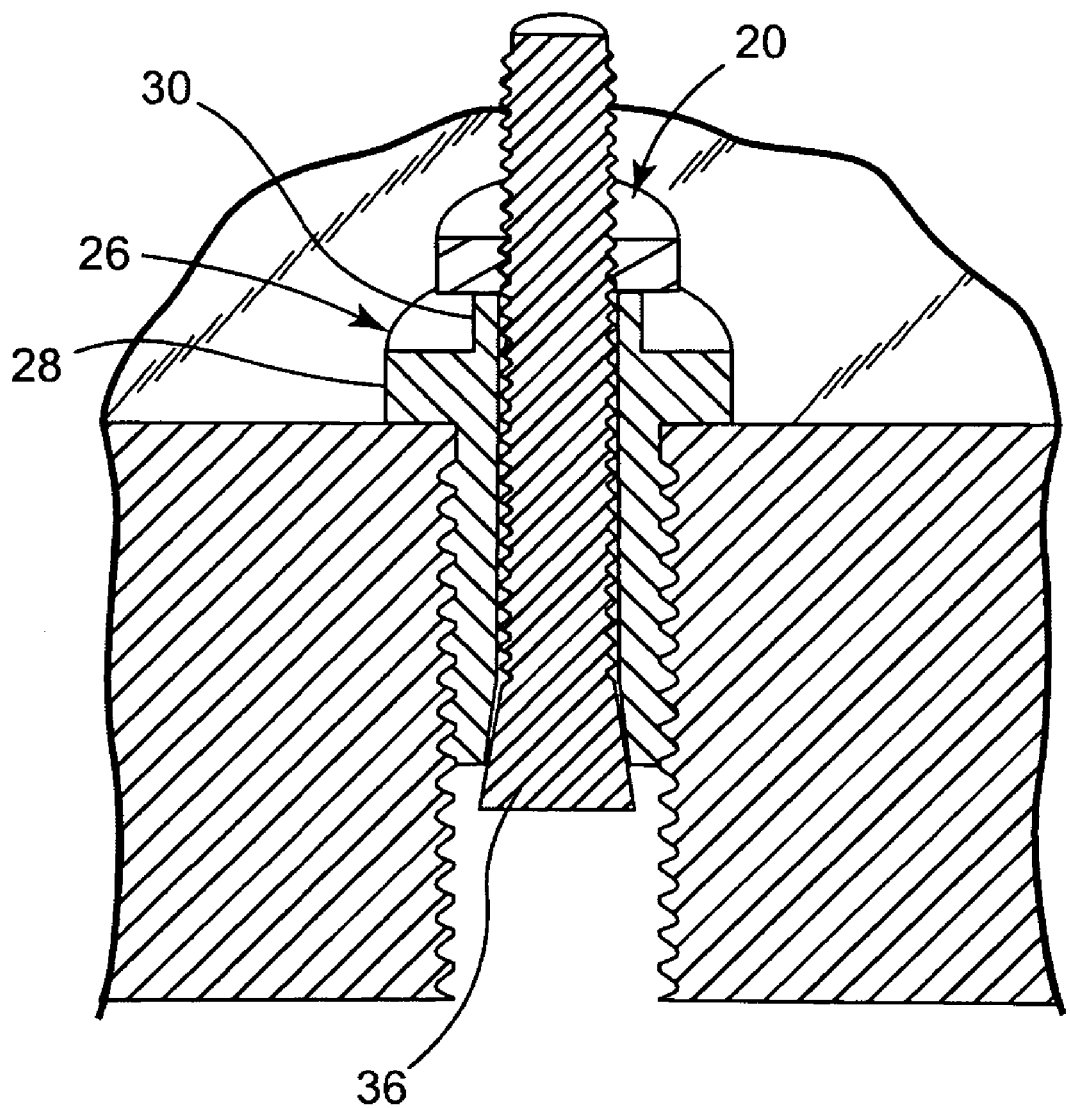
FIG. 6 is a perspective view, in cross-section, of the hole position gauge of FIGS. 1 and 2 showing the tapered portion of the expander engaged with the tapered portion of the bore of the body thereby expanding the expandable portion of the threaded shank.

When the tapered portion 36 of the expander 18 is disengaged from the tapered portion 34 of the bore 32, as shown in FIG. 5, the expandable portion 24 of the shank 22 is not positively urged into engagement with the tapped hole 12 in accordance with the invention. By positively engaged it is meant that at least a portion of at least one thread of the expandable portion 24 is in physical contact with at least a portion of at least one thread of the tapped hole 12 so that the indicating surface 28 is in a predetermined geometric position with respect to the tapped hole 12. More particularly, the center axis of the indicating surface 28 of the indicating feature 26 (as shown in FIG. 3 at reference numeral 46) is preferably aligned with the center axis of the pitch diameter cylinder of the body 16 and thus the tapped hole 12 (as shown in FIG. 3 at reference numeral 44). Thus, as shown in FIG. 6, the tapered portion 36 of the expander 18 can be controllably caused to increasingly engage with the tapered portion 34 of the bore 32, as described below, in order to positively engage the expandable portion 24 with the tapped hole 12 in accordance with the present invention.

Regarding the expandable portion 24 of the shank 22, the expandable portion 24 is preferably designed so that the first and second portions, 38 and 40, can be elastically spread apart from each other. That is, the first and second portions, 38 and 40, are preferably not deformed when the expandable portion 24 is expanded to positively engage with the tapped hole 12. This allows the hole position gauge 10 to be easily removed from the tapped hole 12 so that it can be reused. By disengaging the tapered portion 36 of the expander 18 from the tapered portion 34 of the bore 32 the first and second portions, 38 and 40, can spring back to a position (such as the original position of the portions 38 and 40) to allow easy removability of the shank 22 from the tapped hole 12. In the case of the exemplary expandable portion 24 illustrated in the Figures, any number of slits may used to provide an expanding function in accordance with the present invention.

In any case, any expanding type feature may be incorporated into the design of the shank 22 and a slit-type design does not need to be used. Any expandable feature that can functionally positively engage at least some portion of the shank 22 with the tapped hole 12 in accordance with the present invention can be used. In particular, devices that include expandable arms, pins, and/or plates can be incorporated into the design of the shank 22. Also, hinges and springs, and the like may be incorporated into the design of the shank 22 to provide an expanding function.

The hole position gauge 10 can be operatively installed in the tapped hole 12 by first threading the shank 22 into the tapped hole 12 while the tapered portion 36 of the expander 18 is axially spaced from and thus disengaged from the tapered portion 34 of the bore 32 as shown in FIG. 5. The head 30 is preferably used to drive the shank 22 into the tapped hole 12. This advantageously avoids having to contact or touch the indicating surface 28 with a tool or driving device or the like that could potentially damage the indicating surface 28. The shank 22 can be threaded into the tapped hole 12 so a surface 27 of the indicating feature 26 is in contact with a surface 29 of the workpiece 14, as shown. However, the shank 22 can be threaded into the tapped hole 12 so that the surface 27 is spaced from the surface 29, for example, if the surface 29 is irregular or uneven or if it is undesirable to touch the surface 29 for any reason.

In the state shown in FIG. 5, the expandable portion 24 of the shank 22 is not expanded. The expandable portion 24 of the shank 22 can be expanded to cause the shank 22 to positively engage with the tapped hole by axially driving the tapered portion 36 of the expander 18 to engage with the tapered portion 34 of the bore 32 as shown in FIG. 6. Preferably, as shown, the driver 20 is threaded onto the threaded shaft 46 of the expander 18. The driver 20 can then engage with the head 30, as shown in FIG. 6, so that rotation of the driver 20 causes the threaded shaft 46 to translate axially in the bore 32 and to eventually drive the tapered portion 36 of the expander 18 into engagement with the tapered portion 34 of the bore 32. This action expands the expandable portion 24 to more positively engage with the tapped hole 12 in accordance with the present invention. Preferably, the expandable portion 24 expands elastically so that the expandable portion 24 can be engaged for use and disengaged for removal and reuse of the hole position gauge 10.

Figure 7:
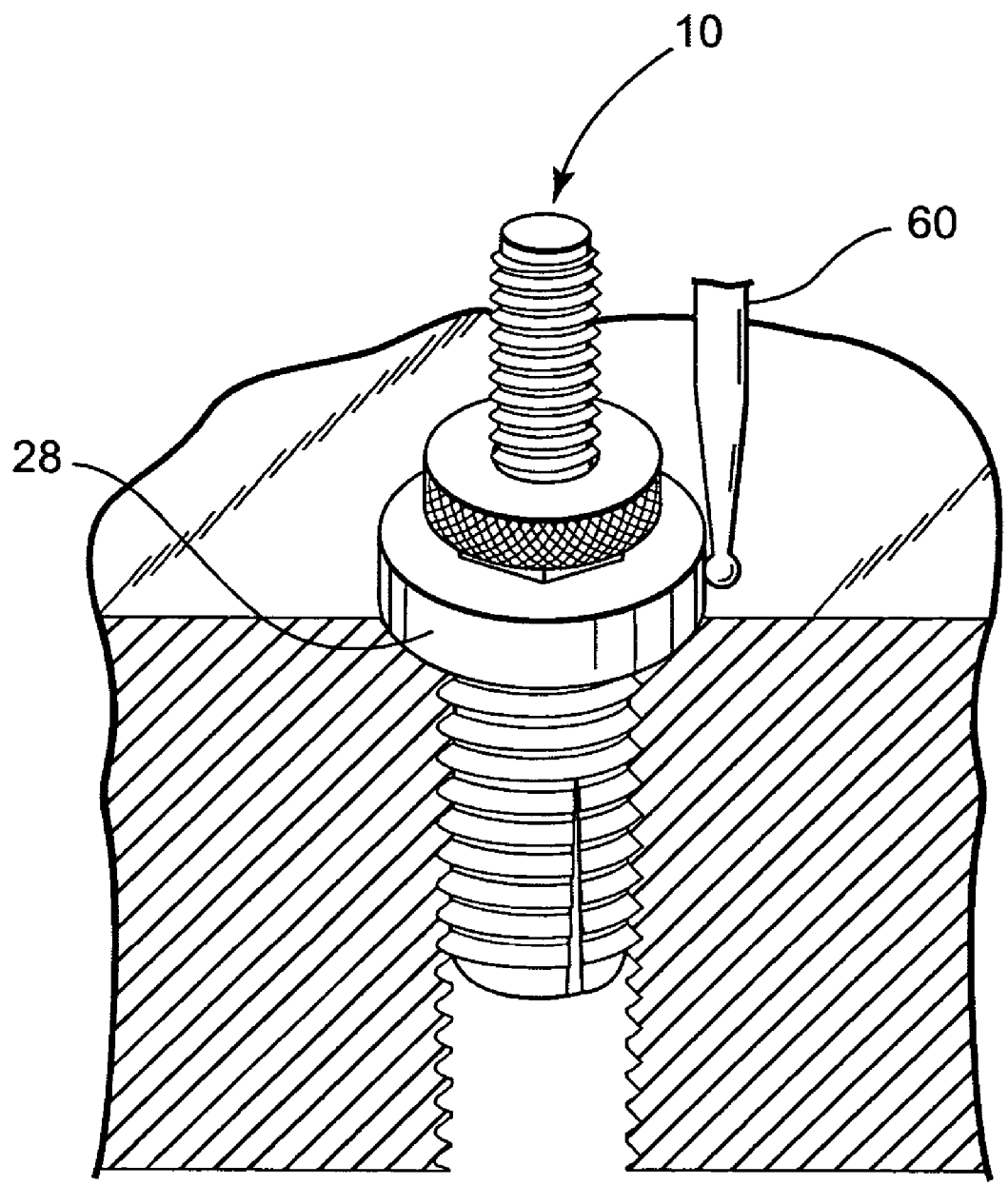
FIG. 7 is a perspective view of a hole position gauge in accordance with the present invention positioned in a tapped hole in a workpiece and showing a probe that can be used to determine the position of a center axis of the tapped hole in accordance with the present invention.

When the hole position gauge 10 is positioned in the tapped hole 12 as shown in FIG. 6, the indicating surface 28 can be referenced relative to the precisely located center axis of the tapped hole 12. For example, as shown in FIG. 7, a probe 60 can be used to touch the indicating surface 28 as a way to reference and to determine the position of the indicating surface 28. Because the indicating surface 28 has a known geometrical relationship with the expandable portion 24 of the hole position gauge 10, as described above, the center axis of the tapped hole 12 can be determined.

In accordance with the present invention, the hole position gauge 10 can be removed from the tapped hole 12 by driving the tapered portion 36 of the expander 18 to disengage from the tapered portion 34 of the bore 32. This causes the expandable portion 24 to disengage or spring back to a position that allows the shank 22 to be removed from the tapped hole 12. The hole position gauge 10 can thus be reused.

The present invention has now been described with reference to several embodiments thereof. The entire disclosure of any patent or patent application identified herein is hereby incorporated by reference for all purposes. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A hole position gauge for indicating the center axis of a tapped hole formed in a workpiece, the hole position gauge comprising:
   a driving head that can be used for installing the hole position gauge into the tapped hole in the workpiece and for removing the hole position gauge from the tapped hole in the workpiece;
   a shank having a center axis, the shank comprising an indicating surface, distinct from the driving head, said indicating surface extending radially past the outermost diameter of the driving head having a predetermined geometric alignment with the center axis of the shank and an expandable sleeve having a predetermined geometric alignment with the center axis of the shank, the expandable sleeve having an inside cavity including a tapered portion;

a shaft slidingly positioned within the inside cavity of the sleeve, the shaft comprising a tapered portion mateable with the tapered portion of the inside cavity of the sleeve; and a driving device to translate the shaft with respect to the sleeve to pull the tapered portion of the shaft to engage with the tapered portion of the inside cavity of the expandable sleeve for expanding the expandable sleeve.

2. The hole position gauge of claim 1, wherein the expandable sleeve comprises at least one slit that allows at least a portion of the expandable sleeve to expand when the tapered portion of the shaft is engaged with the tapered portion of the inside cavity of the sleeve.

3. The hole position gauge of claim 1, wherein the driving head is positioned adjacent to the indicating surface of the shank.

4. The hole position gauge of claim 1, wherein the indicating surface comprises a cylindrical surface having an outside diameter that is larger than an outside diameter of the shank.

5. A hole position gauge for indicating the center axis of a tapped hole formed in a workpiece, the hole position gauge comprising:

a driving head that can be used for installing the hole position gauge into the tapped hole in the workpiece and for removing the hole position gauge from the tapped hole in the workpiece;

a shank having a center axis, the shank comprising an indicating surface and an expandable sleeve, the indicating surface distinct from the driving head and integral with the expandable sleeve, having a predetermined geometric alignment with the center axis of the shank and the expandable sleeve having a predetermined geometric alignment with the center axis of the shank, the expandable sleeve having an inside cavity including a tapered portion;

a shaft slidingly positioned within the inside cavity of the sleeve, the shaft comprising a tapered portion mateable with the tapered portion of the inside cavity of the sleeve; and a driving device to translate the shaft with respect to the sleeve to pull the tapered portion of the shaft to engage with the tapered portion of the inside cavity of the expandable sleeve for expanding the expandable sleeve.

6. The hole position gauge of claim 5, wherein the expandable sleeve comprises at least one slit that allows at least a portion of the expandable sleeve to expand when the tapered portion of the shaft is engaged with the tapered portion of the inside cavity of the sleeve.

7. The hole position gauge of claim 5, wherein the driving head is positioned adjacent to the indicating surface of the shank.

8. The hole position gauge of claim 5, wherein the indicating surface comprises a cylindrical surface having an outside diameter that is larger than an outside diameter of the shank.

* * * * *